May 22, 1934.    M. G. BARNARD ET AL    1,960,097
METHOD AND APPARATUS FOR MAKING ELECTRICAL MEASUREMENTS
Filed Dec. 28, 1929

INVENTOR
MONROE G. BARNARD & HAROLD D. EALSWORTH
BY
ATTORNEY

UNITED STATES PATENT OFFICE 1,960,097

METHOD AND APPARATUS FOR MAKING ELECTRICAL MEASUREMENTS

Monroe G. Barnard, New York, and Harold D. Ellsworth, Flushing, N. Y., assignors to American Photoelectric Corporation, New York, N. Y., a corporation of New York Application December 28, 1929, Serial No. 417,058

14 Claims. (Cl. 88—23)

This invention relates to a method and apparatus for making minute electrical measurements and more particularly to a method and apparatus for measuring the characteristics of light and for measuring the light-absorbing, reflecting, transmitting or producing characteristics of any body.

Prior to our invention it has often been recognized that many practical problems such as the accurate measurement of color or reproduction of colored surfaces, color filters and colored lights could not be solved until some practical and accurate means of color measurement had been developed.

Various methods have been in use for making color measurements, most of which have depended upon visual comparison of colored lights. More recently a method has been developed by which the colored light is analyzed by a spectroscope and its intensity compared with a standard by adjusting the size of the aperture through which the light is allowed to pass to the spectroscope until the current produced in a photo-electric cell is substantially the same as that produced by the standard light through a unit aperture, or vice versa. This method of color measurement, although it has been the most accurate prior to our invention, involves the use of such expensive and delicate apparatus and such long drawn out and careful measurements that its use has not proved to be of practical benefit comparable to the importance of problems whose solutions await the possibility of accurate and rapid color measurements.

We have now discovered that the failure to obtain accurate color measurements by electrical means, which has been almost universal prior to our invention, is in a very large measure due to the failure to protect against minute variations in the electrical characteristics of the circuit used for measuring the response of the photo-electric cell. Where large intensities of light are concerned these minutes variations in the circuit characteristics are not of great importance and they have therefore passed substantially unnoticed and uncorrected in the practical applications of the photo-electric cell. When, however, a beam of light is passed through a spectroscope or other instrument for analyzing it into its constituent colored lights, the light energy in each band is so small that these variations become important. Since no satisfactory way of controlling these errors has been found prior to our invention, it has been conceded that the photo-electric cell was too inaccurate to be of practical value in the measurement of lights of low intensities or in that part of the spectrum to which the cell is comparatively insensitive. Particularly have efforts to use the photo-electric cell for spectrophotometric measurements proved fruitless.

Any device which is to achieve practical importance as a solution to the problems involving color measurements or the measurements of any very small amounts of light energy or of minute changes in current must, in the first place, be accurate and in the second place, be capable of convenient use. Finally, it must not be prohibitively expensive. We have now found it possible to comply with all of these conditions and, by means of a relatively inexpensive apparatus, to measure the relative intensities of various spectrum bands or of other beams of radiant energy of low intensity, etc., more accurately and more quickly than has been possible by any previously known method, electrical or visual.

In the accompanying drawing we have shown diagrammatically apparatus in accordance with our invention and adapted for use in practicing the method of our invention.

Figure 1:
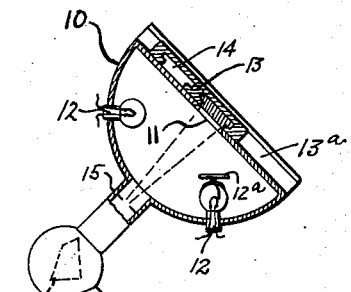
Figure 1 illustrates diagrammatically a preferred embodiment of our invention.
Figure 1:
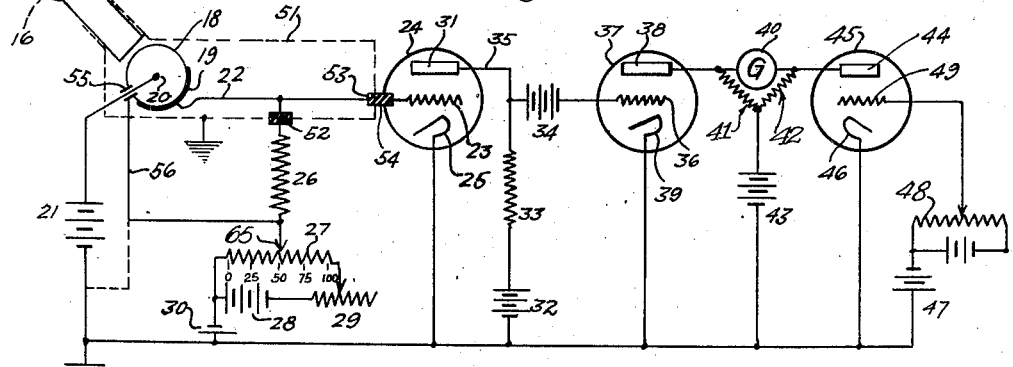

Referring particularly to the drawing, 10 represents a hemisphere used for producing a uniform standard illumination. This internally reflecting hemishere has near the center of its back an aperture 11, and light sources, e. g., incandescent bulbs 12 therein. These bulbs are positioned so that there will be no specular reflection to the spectroscope tube 15 resulting from glaze on the plane surface of the sample. To further protect against direct reflection from the filament into the spectroscope we found it advantageous to provide a screen 12a which, in the present instance, is a white diffusing disk held in place on the lamp by supporting clips. We have found an advantageous angle to be about 45° from the axis of the spectroscope tube. Any desired number of lights may be used, but we have found from four to eight six volt lamps of the type commonly used in automobile headlights to be very satisfactory.

Back of the aperature 11, is a slide 13, e. g., mounted in a track 13a. Two apertures or recesses 14 are in this slide so either may be positioned behind the aperture 11. In one is mounted a flat piece of magnesium carbonate or other standard reflecting substance, and the other is adapted to receive the sample to be measured (preferably flat also).

The source of light 12 is to be chosen such that it will provide a substantially constant light intensity during any one measurement and preferably one which provides a substantially white light or at least one having relatively strong spectrum bands throughout the spectrum to be measured. For this purpose we prefer to use a tungsten filament lamp operated from a storage battery current.

The spectroscope 16 advantageously has in its tube a series of baffles spaced along their lengths with apertures which outline the path of the light from the screen 14 through the lenses to the prism and to the slit. These baffles 17 are shown more clearly in Figure 2 and serve to intercept stray light which may be caused by imperfections in the lenses or result from other causes and which, if allowed to pass on to the prism and to the slit, would add to the pure spectrum band variable amounts of light energy from other portions of the spectrum. The spectroscope 16 is adjustable so that any band of the spectrum may be allowed to pass out through the slit 62.

A photo-electric cell 18 is arranged adjacent the end of the spectroscope 16 and so that light escaping through the slit of the spectroscope will fall on the cathode 19 of the photo-electric cell. A substantially uniform positive charge is maintained on the anode 20 of the cell by a battery 21, while the cathode 19 is connected by a lead 22 to the grid 23 of a thermionic valve 24 and to a portion of the circuit which we will call, for the sake of brevity, an "effective resistance". The negative terminal of the battery 21 is likewise connected to the cathode 25 of the thermionic valve 24 and to the opposite end of the effective resistance.

The effective resistance is composed primarily of a resistance 26 of a high order, advantageously of the same order as the resistance of the cell 18, and graduated means for varying the potential difference across the effective resistance. This graduated means might take any one of several forms as, for example, a variable resistance which by cutting in or out a portion of the resistance would change the potential difference. We have found it more advantageous, however, to use a potentiometer which, in the present instance, is composed of a graduated variable resistance 27, having an indicator and sliding contact diagrammatically illustrated as 65 which advantageously is a Kohlrausch bridge, a source of electro-motive force, e. g. a battery 28, and a variable resistance 29. Another battery 30 may be used to bring the grid cathode potential in the thermionic valve 24 to a value corresponding to approximately the center of the slope of the grid potential-anode current characteristic curve.

The cathode 25 and the plate 31 of the valve 24 are connected into a circuit which, in the example illustrated, is an amplifying circuit. In some cases the amplifying circuit may be omitted and the plate cathode circuit of the valve 24 be measured directly. We have found, however, that with the circuit illustrated amplification does not substantially increase the experimental error, and we therefore find it advantageous to use one or more stages of amplification and a less sensitive indicating instrument or to connect the amplified circuit directly to some device which it is desired to operate when the measuring indicator reaches the figure corresponding to the response of the photo-electric cell.

In the present example the amplification circuit consists of a battery or other source of electro-motive force 32, a resistance 33 and a battery 34 adapted to oppose the charge on the lead 35 to the plate 31 of the valve 24. The negative terminal of the battery 32 is connected to the cathode 25 of the valve 24, while its positive terminal is connected through the resistance 33 and the lead 35 to the plate 31 of the valve 24. The variation in charge on the lead 35 resulting from variations in the charge on the grid 23 is reflected in the variations of the charge on the grid 36 and consequently causes corresponding variations in the current flowing in the plate cathode circuit of the valve 37.

It will be apparent, as pointed out above, that additional stages of amplification may be used. In the present instance, however, the plate 38 and the cathode 39 are connected directly to the balancing bridge circuit used for indicating the charge on the lead 22. This circuit comprises a galvanometer 40, or other instrument responsive to current flow, and resistances 41 and 42, preferably equal, connected to opposite sides of the galvanometer. A positive terminal of a battery 43 is connected to both of the resistances 41 and 42, while the plates 38 and 44 of the valves 37 and 45 respectively are connected respectively to one side of the galvanometer 40 and the resistance 41 and to the other side of the galvanometer 40 and the resistance 42. The negative terminal of the battery 43 is connected to the cathode 39 of the valve 37 and of the cathode 46 of the valve 45. The battery 47 is connected to the cathode 46 and to the grid 49 through the potentiometer 48 or other means for varying the grid cathode potential of the valve 45.

A shutter 50 is provided in the spectroscope tube in order that light may be cut off entirely from the photoelectric cell 18. If the apparatus is to be used for making transmission measurements thus shutter 50 is preferably made so that it may either shut off the light entirely or allow all light to pass from the slot to the cell or may place the light filter which is being measured across the tube so that the light must pass through the filter to reach the photo-electric cell. Obviously separate means may be provided instead of a single means to perform these two functions. A very satisfactory arrangement is a dark slide accurately fitting into the tube so as to substantially prevent entrance of light and having one imperforate portion adapted to cut off the passage of light through the tube and another portion having window or preferably two windows and a slot adjacent the window for receiving the light filter. This slide is adapted to be moved across the tube so as to bring either the imperforate portion or either window into alignment with the tube.

A dark container which is indicated diagrammatically by the dash line 51 on the drawing is arranged to hold the photo-electric cell 18 and the cathode lead 22. This container 51 is substantially light-tight and is preferably also adapted to prevent ready exchange of air with the outside atmosphere and is advantageously heat insulating. The tube of the spectroscope 16 enters through the wall of the container 51 so that light from the source 12 may enter through the spectroscope. An insulating sleeve 52 of a substantially non-hygroscopic material, that is, a material whose resistivity is changed relatively slightly with changes in humidity of the surrounding atmosphere, protects the lead to the resistance 26 against leakage to the wall of the container 51. Similar insulating sleeves 53 and 54 protect the lead 22 against leakage to the container 51 and the base of the thermionic valve 24. These insulating sleeves may be made of various materials such, for example, as the material known as bakelite L 558, which is a substantially pure phenol formaldehyde condensation product and is substantially non-hygroscopic, beeswax, ceresin, ivory, rosin, sulphur, tetrachlornaphthalene, vitreous silica or fused quartz. We have found sulphur or rosin most suitable for this purpose, because, among other reasons, they may be readily cast in place about the conductor. We have found that the use of these protecting sleeves is important because the minute changes in leakage from the lead 22 which result from changes in atmospheric conditions are, as compared with the minute currents being measured, important sources of error. For this reason we have found that it is inadvisable even to trust to the usual leads from the thermionic valve and for this reason we alter the thermionic valve as it is commercially supplied for other uses by taking the grid lead out through the side of the base instead of from the bottom of the base and protecting it against leakage by a sleeve of non-hygroscopic insulating material. The size of the sleeve will depend to some extent upon the material used and upon the conditions of operation. We have found that a sulfur sleeve approximately one-half inch in diameter with the conductor approximately at its center works satisfactorily under ordinary conditions.

In order to further protect against leakage from the cathode 19 or its conductor 22 we provide a guard ring 55 around the photo-electric cell and cutting off the point at which the anode conductor passes out through the wall (ordinarily the base) of the cell from the point at which the cathode conductor passes out. A conductor 56 grounds this guard ring, e. g. either to the negative terminal of the battery 21 or to the end of the resistance 26 adjacent the potentiometer 27 or to any intermediate point. The guard ring is advantageously as close as is possible and convenient to the point at which the anode conductor passes through the cell wall while still avoiding excessive leakage from the anode. The purpose of this guard ring is to intercept and lead off from the surface of the cell 18 any current which might otherwise leak across from the anode conductor to the cathode conductor.

It will be understood of course, by those skilled in the art, that the cathodes 25, 39 and 46 of the thermionic valves will be heated by suitable means which will ordinarily consist of a separate heating circuit. Since this so-called filament heating circuit is of a well known type and forms no part of the present invention it has not been included in the drawing but its application will be readily understood by those skilled in the art.

In the operation of the device as thus far described the light 12 is connected to a source of substantially constant electric current and is permitted to burn until the light which it gives off is substantially constant. The slide 50 is moved to a position in which it will shut off all light from passing through the spectroscope. The potentiometer 27 is then set at zero, that is, with its contact at the extreme left-hand end of the resistance as shown in the drawing and the potentiometer 48 is adjusted until the galvanometer 40 comes to balance. At this point the circuit is so adjusted that the galvanometer will respond by balancing whenever the cathode 19 and consequently its conductor 22 and the grid 23 return to the same charge. The slide 50 is now moved so as to admit the illumination from the sphere 10 unobstructed and the spectroscope 16 is adjusted so that the particular band of the spectrum which is being measured will fall upon the cathode 19. The potentiometer may now be turned to the 100 position, that is, the contact from the resistance 26 is moved to the right-hand end of the potentiometer resistance and until the scale of the potentiometer is at the figure 100. At this point the reduction of the charge on the cathode will ordinarily not be exactly compensated by the change in the potentiometer and if not it will then be necessary to calibrate the potentiometer by adjusting the variable resistance 29 until the charge of the cathode 19 and the grid 23 are returned to the same value as when the cell was dark. This return will be indicated by the balance of the galvanometer 40. The potentiometer 27 is now calibrated to the cell 18 and to the particular illumination at the wave length being measured. Assuming that the measurement is to be of the transmission through a translucent body, the body is placed in the slide 50 so as to extend across its window and the slide is moved into a position such that all light passing from the spectroscope must pass through the translucent body. Without disturbing the adjustment of any other part of the apparatus and while maintaining the apparatus under as nearly the same conditions as possible, the potentiometer 27 is now adjusted back toward the zero position until the galvanometer 40 again comes to balance. At this point the cathode 19 is restored to its original charge and the increased electro-motive force introduced by the adjustment of the potentiometer 27 from the zero position to the balancing position is exactly equivalent to the increase in potential difference across the resistance 26 due to the increased current through the circuit which results from the light falling on the cell 18. Since each of these factors bears a linear relation to the other the scale of the potentiometer 27 (which is, of course, proportional to the increase of electro-motive force between the points zero and 100 on the scale) will indicate directly the percent of the total light at the wave length being measured which is transmitted through the body. Some of the uses to be made of the data obtained by this process and other ways of using the apparatus will be discussed below.

In setting up the apparatus there are certain considerations to be kept in mind in choosing and proportioning the various units, although of course many variations which will be understood by those skilled in the art may be made from the particular arrangement and specifications of the apparatus as described herein. The photo-electric cell will, of course, be chosen so that its greatest sensitivity is within the part of the spectrum in which measurements are to be made. The portions of the circuit represented on the drawing by straight lines connecting various elements of the apparatus will be low resistance conductors of suitable metals such as copper, silver, etc. suitably insulated from other parts of the apparatus and from the ground. The light source 12 is preferably operated from a battery in order that the current and therefore the light intensity will be as nearly constant as possible. The batteries and resistances, according to the specific example which we have found most satisfactory, are as follows: The battery 21 is about 100 volts, the battery 30 is about 1½ volts, the battery 28 about 1½ to 3 volts, the resistance 26 about 10 million ohms, the resistance 33 about 250,000 ohms, the battery 32 about 90 volts, the battery 34 about 30 volts, the resistances 41 and 42 about 30,000 ohms each, the battery 43 about 90 volts, the battery of the potentiometer 48 about 1½ volts and the resistance of the potentiometer sufficient to avoid running down the battery and the battery 47 about 1½ volts.

It will be understood, of course, that these values are given only to indicate in a broad way the proportions which have been used in a particularly satisfactory embodiment of the invention but that the exact proportions will depend upon the characteristics of the elements of the apparatus and particularly of the valves 24, 37, 45 and of the cell 18. The batteries 30 and 47, for example, are to be of such voltage as to bring the charge on the grid of the valves 24 and 45 near the center of the grid potential-anode current characteristic curve. This characteristic will, of course, depend also upon the plate-cathode potential which is controlled by the battery 32 so that any increase in the voltage of the battery 32 will require an increase in the battery 30 to bring the valve 24 back to its range of best operation.

The batteries 21, 28, 30 and 32 are advantageously also proportioned to each other so that when the circuit is adjusted for a calibration or measurement the valve 24 is not only approximately at the center of its grid potential-anode current characteristic curve but also so that no current flows in the grid cathode circuit, i. e., so that the grid potential is zero or negative. Thus, as accomplished by proportioning the batteries so that the effective E. M. F. of the batteries 28 and 30 in the grid-cathode circuit fully counteracts the E. M. F. of the battery 21 in that circuit whenever the charge on the conductor 22 is restored to its predetermined value, e. g., in the manner already described. Since the cell cathode conductor 22 and the grid 23 are always restored to a predetermined charge and since the cathode 25 of the valve is directly connected to the negative terminal of the battery 21, the charge thereon does not vary, and consequently whenever the circuit is adjusted to restore the charge on conductor 22 the current flow in the grid cathode circuit will be the same. The greater the current flow in the grid cathode circuit, however, the less will be the flow through the measuring circuit, i. e., through the potentiometer, and consequently the more difficult will accurate measurement become. We have found therefore that the best results are obtained when the grid cathode potential is adjusted to zero, or a negative potential.

The resistance 26 may vary within considerable limits without departing from the scope of our invention but should, in general, be sufficiently high to give a substantial drop in potential with a current as small as 0.1 micro-ampere or less specifically, with a minimum change of current encountered in the light measurements which are made with the apparatus. The voltage of the battery 32, as already explained will depend upon the characteristic of the valve 24 and also upon the voltage of the battery 30. Similarly the resistance 33 and battery 34 will depend upon the characteristics of the valves used. This portion of the circuit is a well known amplification circuit and the proportioning of its parts will be readily understood by those skilled in the art. Likewise the resistance 41 and 42 and the battery 43 must be varied to suit the characteristics of the valves 37 and 45.

Although we have shown the valve 24 and the amplifying and bridge circuit connected thereto as the most satisfactory method for accurately and quickly determining a charge on the cathode of the cell 18 it is to be understood that this part of the apparatus is merely an instrument for determining the charge and that other instruments may be chosen or devised for the same purpose without departing from the scope of our invention. Thus, with very high intensities of light it may, in some cases, be possible to measure this charge directly with a galvanometer or an electroscope or some modification thereof may be used for this purpose. Our experience, however, has shown that the instrument which we have devised and shown in the drawing for determining the charge on the cathode is superior in practice to any other which we have thus far tested.

Similarly it is to be understood that the bridge circuit shown at the right-hand of Figure 1, is merely an instrument for measuring the flow of current in the amplifying circuit and that this might be measured in other ways.

When the bridge circuit is used, as shown, it is to be understood, of course, that the galvanometer 40 is merely exemplary of an instrument to determine when a current is flowing between the ends of the resistances 41 and 42. Instead of a galvanometer other instruments may be used for the same purpose or a neon or other gas discharge tube may be used which will light when a predetermined potential difference is established.

Although many changes may be made in the apparatus which we have described above and shown diagrammatically in the drawing, we believe that it is of great importance to carefully protect against variations, in the leakage and so far as possible to protect against any leakage from the cathode 19 and the conductor 22. This leakage has been a great stumbling block in the art prior to our invention so that it has been universally conceded heretofore that the photo-electric cell could only be considered as practically accurate for measuring light intensities which produce in the cell currents so large that the leakage had been unimportant. With minute currents such as result from exposure of the cell to single bands of the spectrum all prior attempts at direct photo-electric measurement had failed, very largely because the leakage currents in all apparatus used heretofore have been of magnitudes comparable to the cell currents resulting from the light. If the leakage is kept constant by carefully controlled atmospheric conditions it can be determined and compensated for either in the apparatus or by calculation for the correction of observed results. A practical way of accomplishing the control of atmospheric conditions is the use of a container as indicated at 51 and described above and the non-hygroscopic insulators 52, 53 and 54 serve to prevent the uncontrolled conditions outside the container 51 from introducing substantial variations in the current of leakage. The guard ring 55 being of substantially the same potential as the cathode further serves to very greatly reduce the total amount of leakage.

The careful control of circuit conditions, that is, the maintenance of voltages and resistances in the circuit and also in the lighting circuit for the light source 12, are also to be kept as nearly constant as possible; and similarly the light which enters and passes through the spectroscope to the photo-electric cell must be a controlled sample of the illumination excluding, so far as possible, all stray light from passing through the spectroscope. For this purpose we have provided in the tubes of our spectroscope, screens 17 at spaced intervals, apertures in which outline the pencils of light which are passed through the tubes. In this way we are able to intercept and absorb in the non-reflecting walls of the tube and/or of the baffle screens light which does not form a part of the pencil and which, if allowed to pass on through the spectroscope, would throw light of a different color, together with the spectrum band being measured into the photo-electric cell. This construction we have illustrated more clearly at Figure 2.

When the apparatus is to be used for determining the reflection characteristics rather than the transmission characteristics of a body, a suitable reflecting screen e. g. of known reflecting characteristics 14 is placed so that the light entering the tube 15 will be light reflected from the screen 14. The circuit is balanced for zero and for the light reflected from the screen 14 and then the body to be measured is put in place of the screen 14 so that its reflecting surface is in substantially the same plane as was that of the screen. The potentiometer 27 is then adjusted as described above until the charge on the cathode is restored to its original value, whereupon if the screen 14 reflects substantially all of the light the reading of the potentiometer will represent the present reflection of the body being measured at the wave length of the band exposed to the cell. If the screen 14 is not a perfect reflecting surface the potentiometer 27 should then be adjusted not to 100 but to the percent reflection of the screen at the wave length being measured when the circuit is being calibrated to the full illumination. If, however, a screen is not available the reflection characteristics of which are accurately determined, then it is necessary to change the position of the spectroscope tube with respect to the reflecting sphere 10 so that it receives into the tube substantially that part of the incident illumination which would fall upon that part of the reflecting surface to be measured which reflects into the tube 15 during measurement.

We have already indicated in the preceding paragraph how the potentiometer may be set to some other value than 100 in order to compensate for or eliminate disturbing factors which would otherwise require correction by calculation of the observed results. Many other factors than the reflection factor mentioned above may be compensated for in this way. Thus, for example, the effect of a given color upon a light-sensitive device, e. g., the human eye, may be determined directly if the sensitivity curve for the device is known. Thus at each band of the spectrum the potentiometer scale may be set to a figure which represents the sensitivity of the device to light of that wave length and the measurement which results with the potentiometer thus calibrated will include the sensitivity factor and therefore will not require a correction for such factor by calculation.

In a similar manner we may determine the characteristics of a beam of light and compare it to a standard beam of light of substantially uniform wave length. In such measurement the scale of the potentiometer is set to a figure which represents the response of the particular photo-electric cell being used to light energy of the wave length being measured proportionate to the response of the cell to the same amount of light energy at the wave length of the standard light which is falling upon the cell during the calibration. When the circuit has been calibrated for the standard light in this manner and for zero in the same manner as described above, the spectrum band from the light being measured for which the calibration has been made, is measured by adjustment of the potentiometer until the galvanometer balances. The reading on the scale of the potentiometer will give directly the intensity of the band measured in percent of the intensity of the standard light. When this is repeated for each band of the spectrum the full data for the energy distribution curve of the light measured will have been obtained.

For the energy distribution curve as obtained above, color temperature, among other things, may be determined. However, the color temperature of an incandescent body may be more simply determined by making determinations at only two points of the spectrum and determining the ratio of the light intensities at these two points. When this ratio is compared with the ratio of intensities at similar bands of the spectrum on known color temperature curves it will be found that the ratio is characteristic and is sufficient to determine which curve belongs to the incandescent body which has been measured.

It is desirable in all cases to treat the unknown light and the standard in the same optical system in order that they may be directly comparable. It is, of course, possible to treat the beams of light differently if the difference is known so that suitable correction may be made or if the difference will cancel out in the measurement or in the use which is to be made of the figures obtained. In the accompanying claims we have referred to beams of incident light and emitted light with this in mind, intending to particularly refer to comparable beams but without intending to exclude from the claims the use of beams of light which are not comparable or which are differently treated if suitable correction is made for the factor resulting from the difference.

We have further discovered that it is possible by the use of our apparatus to reproduce exactly colors which are formed by mixing pigments of dyes or other colored materials. For this purpose we determine, for example, by the methods described above the fraction of the incident light which is absorbed at each of a number of different bands of the spectrum for the composite color which it is desired to reproduce and for the constituent colors which are to be mixed. The number of bands of the spectrum at which determinations are made should be at least as many as the number of constituent colors and preferably fairly widely separated in the spectrum. For practical purposes with fine pigments and dyes the absorption or reflection of the composite color at each spectrum band may be equated to the sum of the absorptions or reflections of each of the constituent colors multiplied by the number of parts of that color and the sum divided by the total number of parts of all colors. This will give an equation with as many variables as there are constituent colors and by making determinations at as many points of the spectrum as there are constituent colors a system of simultaneous equations may be built up and solved to give the proportion of each color which is required in the mixture. Thus, assuming that a red, a blue and a gray are to be mixed in unknown proportions to give a color, a sample of which is available, the determinations may be made, for example, at a wave length of 4000 Ångström units at which the red might show an absorption of 80, the blue of 10 and the gray of 50 percent, while the composite color would show an absorption of 60 percent. At 5000 Ångström units the red might show 40 percent absorption, the blue 40 percent, the gray 50 percent and the composite color a total absorption of 42 percent. At 6000 Ångström the red might show 20 percent, the blue 70 percent and the gray 50 percent, and a total absorption for the composite color of 36 percent. These results may be written:

$$\frac{80R+10B+50G}{R+B+G}=60$$

$$\frac{40R+40B+50G}{R+B+G}=42$$

$$\frac{20R+70B+50G}{R+B+G}=36$$

This system of equations when solved simultaneously will give the proportions of red, blue and gray which are to be mixed in order to reproduce the desired color as three, one and one respectively.

In the case of transmission we have found that a different formula must be used. In this case the transmission at each wave length of the mixture ($T_m$) is equal to the product of the transmissions of each of the constituent colors each raised to a power equal to the decimal proportion of that constituent in the mixture.

$$T_m = T_1^{P_1} \cdot T_2^{P_2} \ldots \ldots T_n^{P_n}$$

where $T_m$, $T_1$, $T_2$ etc. are the measured percent transmission at the particular spectrum band and $P_1$, $P_2$ etc. are the decimal proportions of each. By constructing $n$ equations representing measurements at as many points in the spectrum the equation may be solved simultaneously for $P_1$, $P_2$, .... $P_n$.

Figure 2:
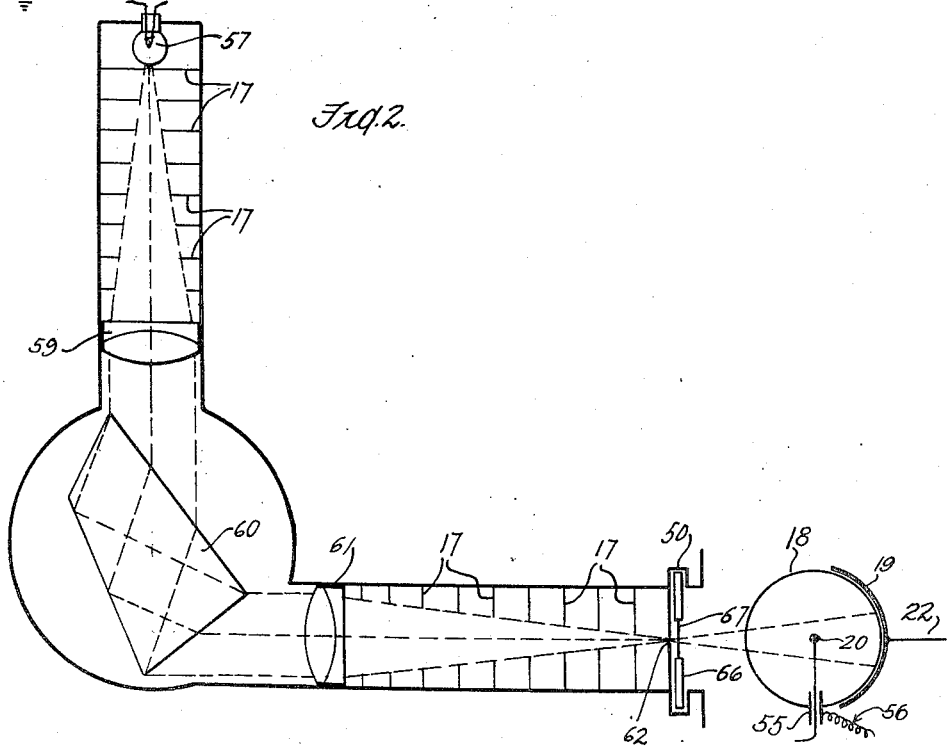
Figure 2 illustrates in longitudinal section a spectroscope tube used in the embodiment shown in Figure 1.

In Figure 2 we have shown an alternative method of providing a standard illumination which is particularly advantageous for making measurements of translucent or transparent bodies. In this example an incandescent filament light source 57 is positioned substantially at the focus of the lens 59. Between the light source 57 and the lens 59 the baffles 17 cut off all light except that of the pencil from the focus to the lens.

With this arrangement the circuit is first calibrated as above described either with the light source 57 turned off or with its light excluded by the slide 66. The slide 66 is then set to permit all the light of the pencil to pass unobstructed to the cell 18 and the circuit is calibrated for the full-light current of the cell. Finally the translucent body 67 is put in position to intercept the light as shown in Figure 2 and the cell current is measured.

Since the baffles 17 intercept all light except that of the pencil from the focus to the lens, the light leaving the lens 59 is all in parallel rays which are differentially deflected according to wave length by the prism 60. As the prism is turned about its axis light rays of different wave length may in succession be brought into focus on the slot 62 and pass through to the photo-electric cell. Light of other wave lengths will not be focused on the slot and consequently will be intercepted and absorbed by the baffles.

In order that a maximum amount of light may pass through the slot 62, we have found it advantageous to use a filament in the form of a straight line, or more accurately of such form and so related to the lenses 59 and 61 as to produce a straight line image at the focus in the slot 62.

In referring above to a filament we do not wish to be understood as limiting the light source to a solid filament. Instead of the usual tungsten filament we may for example use what may be considered an incandescent gas filament, i. e. an electrical discharge to avoid reflected light and for this reason we find it advantageous where a metal or other solid filament lamp is used to provide a non-reflecting screen behind the filament or even surrounding the filament except where the light of the required pencil comes through. For this purpose we may coat the inside of the bulb with a substantially black non-reflecting coating material, and preferably also similarly coat the filament carrying parts which are sealed into the bulb.

The slide 66, as shown in Figure 2, is advantageously positioned between the slot 62 and the photo-electric cell and as close as possible to the latter. This is very important in the case of translucent diffusing bodies which would scatter the light so that that which actually would come through the spectroscope would be only a small part of the total transmitted. When the sample is placed just in front of the cell the light scattered by diffusion in the sample is nevertheless received in the cell and produces its response. In the case of a transparent body the diffusion is slight and therefore its position is less important; while in the case of reflection the sample is placed beyond the spectroscope and the diffusion effect is reversed by illuminating the sample with a diffuse light and sampling the light reflected in one direction.

Although we have described above novel methods which may be practised using the apparatus of our invention which relate particularly to color measurements and spectrophotometry nevertheless we do not wish to give the impression that our invention is limited in its application to color measurements or spectrophotometry. On the contrary, it has proved of inestimable value wherever measurements are to be made of minute changes in current. Thus, for example, it may be used for measurements of light of low intensity without the use of the spectroscope and may be applied as well to electrical measurements which do not involve the use of the photo-electric cell as, for example, in the accurate measurements of hydrogen ion concentrations by electrical methods.

Another important application of our invention is in the making of accurate pyrometric measurements. This field is one which has heretofore of necessity been left to extremely inaccurate methods. Cones of materials which soften and slump down at different temperatures are frequently used or visual comparison of the color of a heated body, but no satisfactory method has heretofore been known by which temperatures such, for example, as that of molten metals could be accurately determined. By the use of our apparatus and method we are able to determine with reasonable accuracy changes of as little as one degree C. even at very high temperatures, e. g. at or above that of molten steel or glass, etc. as well as at lower temperatures. Furthermore, our process has the advantage that no instrument need be put in contact with the hot body in order to make the measurement and thus even at lower temperatures where reasonably accurate measurements could have been made by known means our method represents a substantial improvement because the temperature of a hot body can be measured at a distance from the instrument and while it is being treated by other apparatus.

In making such measurements we place the spectroscope of our apparatus such as that above described, so as to receive radiation from the hot body. This radiation is separated into its spectrum by the spectroscope and one band at a time is permitted to fall upon the cathode of the photo-electric cell, it being understood that a "band" as used herein is a band of substantially uniform wave length. Two or more measurements at different points in the spectrum are made and the ratio or ratios of these values determined. These ratios are characteristic of a particular temperature for the material of which the hot body is composed and the ratio of radiation energy at two different wave lengths may be compared with a curve on which similar ratios for the same material are plotted against actual temperature or the ratio of the cell response at one wave length to that of another wave length may be compared with a similar curve in which ratios of cell response at the same wave lengths for the same cell and for the same material are plotted against actual temperature.

In some cases it will be unnecessary to determine actual temperature and it will only be required to reproduce a temperature which is known to be optimum. In this case the characteristic ratio of the optimum may be readily determined and when this ratio is reproduced it will be known that the body is at the desired temperature without any reference to a standard temperature scale. If the measurements are to be made repeatedly with the same instrument it will not be necessary to correct for the energy-response characteristic of the cell. If, however, it is desired to make successive measurements with different instruments or to obtain results which are not dependent upon the instrument used then the measurements should be corrected for this factor either by calculation or by setting of the potentiometer as described above.

The measurements which are used for determining the characteristic ratio may be made in any portion of the visible ultra-violet or infra-red spectrum. However, since at the relatively lower temperatures the radiation is strongest in the red and infra-red portion of the spectrum it is advantageous to make the measurements in this part of the spectrum.

In order that measurements may be readily made of the intensity of radiation in this portion of the spectrum a photo-electric cell should preferably be chosen whose energy-response characteristic curve is at a maximum or at least at a high value as far as possible into the red end of the spectrum or if the measurement is in a different part of the spectrum so that the curve will have a maximum near where the measurements are made. Which two or more points are chosen to determine the ratio is not important although, of course, the ratio will be different if different points are chosen but will in any case be characteristic of the temperature. It is desirable, however, to have the points at which measurements are made sufficiently far apart so that a ratio not too closely approaching unity will be obtained. We have found that a separation of 100 millimicrons more or less is a desirable one.

In the accompanying claims we have used the term "effective resistance" to include a resistance alone or a resistance partially counteracted by a supplementary electro-motive force. By the phrase "means for adjusting potential difference" it will be understood that we intend to include a simple variable resistance or a potentiometer for introducing a variable supplementary E. M. F. or other suitable means for varying the potential difference through a portion of the circuit so as to bring the charge in the cathode back to a predetermined value. We have used the term "instrument responsive to the charge" to include any means for determining when the charge on the conductor is returned to a predetermined value whether it includes additional circuit elements or merely a single instrument which responds to the predetermined charge.

We have used the word "representing" referring to the figure at which the means for varying the potential is set during calibration and to the figure which is indicated by said means when the measurement is complete, and we intend to include within the meaning of this term not only the exact value which the figure represents but also such value when corrected by any suitable factor so that it represents either a corrected value or represents some other value as well as the one referred to.

In referring to beams of light in the accompanying claims we have intended to refer to comparable beams, that is, either beams of the same intensity and cross sectional area treated in the same manner except for the procedure of the measurement or beams which differ from each other in a known manner so that a suitable correction factor may eliminate the difference. In the latter case, it will be understood, of course, that the observed values or the calibration of the instrument will have to be corrected by such factor although for brevity's sake we have not included such operation in the claims.

What is claimed as new is:

1. A device for measuring light intensities which comprises a photo-electric cell; a source of constant electro-motive force connected therewith; an effective resistance in series therebetween; means for varying the effective resistance; means for indicating the degree of change effected by said varying means; means for varying, proportionally throughout its range, the relation of said varying means to its indicating means; and means for indicating the charge on the connection between said cell and said resistance means.

2. A device as defined in claim 1, in which the means for varying the effective resistance is a potentiometer and the means for varying the relation of the resistance to its indicating means is a variable resistance in the potentiometer circuit variable independently from the principal resistance thereof, and arranged in said potentiometer circuit so that it is shunted out of the cell circuit when the potentiometer is in the zero position.

3. A device for measuring changes in conductivity which comprises a source of constant electro-motive force, an effective resistance connected in series therewith, connections for completing the circuit through the element to be tested, means for determining when the charge on the connection between the resistance and the element being tested reaches a predetermined value, means for varying the effective resistance, means for indicating relatively the amount of such variation, and means for varying proportionally throughout its range the relation of the indicating means to the resistance varying means.

4. A photometer comprising a photo-electric cell, a source of substantially constant electromotive force connected thereto, an effective resistance in series therewith, comprising a fixed resistance of the same order as the resistance of the photo-cell, and a potentiometer adapted to vary the effective resistance by adding known increments of electro-motive force to the circuit, means for indicating when the potential on the connection between the photo cell and the effective resistance is at a given value; said means including a thermionic valve having its grid connected to said connection between the photo-cell and effective resistance, a supplemental source of electro-motive force in the grid-cathode circuit of said valve adapted to counteract the effect of the first named source of constant electromotive force, and to maintain a negative charge on said grid, means for amplifying the plate current of said valve, and a quick operating indicator responsive to said amplified current.

5. A photo-meter as defined in claim 4, in which the quick operating indicator comprises a galvanometer in a Wheatstone bridge circuit, of which the amplifying means forms one leg and the opposite leg is adjustable to bring the galvanometer to any desired point on its scale for a given potential on the photo-cell cathode, and the effective resistance includes an independently variable resistance in series with the graduated resistance of the potentiometer, but external to the circuit through the zero connection, whereby to vary the effect of said potentiometer on the effective resistance.

6. The method of determining color characteristics of a body which comprises excluding all light from a photo-electric cell, imposing a negative charge upon the cathode of said cell, while the cell is thus charged and dark, setting to zero on its scale a means for varying the potential difference across a circuit portion in series with a photo-electric cell, while the cell is thus dark and charged and the variable potential means is thus calibrated, adjusting a charge-indicating instrument to give a characteristic response at the charge then existing on the cathode of the photo-electric cell, separating a constituent colored light from light of constant intensity to be used in said measurement, directing said colored constituent light onto the cathode of the photo-electric cell, while the photo-electric cell is thus illuminated, calibrating the scale of the variable potential means to a factor representing full illumination by setting the scale to said factor without disturbing its zero calibration, adjusting said variable potential means relative to its scale until the charge on the cathode of the photo-electric cell is restored to the same value as shown by the characteristic response of the indicating means, interposing the sample into the optical path of the colored light constituent without otherwise changing said optical path, and adjusting the calibrated variable potential means until the charge on the cathode is restored to the same value as indicated by the characteristic response of the indicating means, whereupon the scale will indicate the intensity of the light after absorption by the sample as a fraction of the intensity before absorption, multiplied by the factor to which the scale of the variable potential means was calibrated for full illumination.

7. The method of measuring light by means of a photo-electric cell connected in circuit with a variable effective resistance having means associated therewith to indicate its variation, and a source of constant electro-motive force, which comprises determining the charge on the connection between said resistance and the photo-electric cell when the latter is dark and a variable portion of said resistance is calibrated to zero on the indicating means; exposing said cell to a light of intensity taken as standard and, while maintaining the zero calibration, adjusting said variable portion to restore the connection between the photo-cell and the resistance to the same charge as with the dark cell, and calibrating the indicating means to a value which represents the intensity of the standard light; exposing the cell cathode to a light of intensity to be measured, and restoring to said connection between said cell and resistance its same charge by varying said variable portion of the effective resistance without affecting its relation to its indicating means, whereby said indicating means will show directly the intensity of said light quantitatively on the same scale as that in which the intensity of the standard was expressed.

8. The method of measuring light by means of a photo-electric cell connected in circuit with a variable effective resistance having means associated therewith to indicate its variation, and a source of constant electromotive force, which comprises, determining the charge on the connection between said resistance and the photo-electric cell when the latter is dark and said resistance is varied to a point calibrated zero on the indicating means, exposing said cell to a light of intensity taken as standard and varying said resistance to a point calibrated as a value representing the intensity of a standard light while restoring the connection between the cell and the resistance to the same charge as with the dark cell, exposing the cell cathode to a light of intensity to be measured and restoring said connection between said cell and resistance to its same charge by varying said resistance to a point on a calibrated scale determined between said two previous points, whereby said indicating means will show directly the intensity of said light quantitatively on the same scale as that in which the intensity of the standard was expressed.

9. An apparatus for measuring intensity of light which comprises a photo-electric cell, said cell being connected to the grid of a thermionic valve and to a high resistance element, a source of substantially constant electromotive force in circuit with said cell and resistance having one of its terminals connected to said cell through said high resistance, means for restoring the potential difference between said cell-resistance connection and the source of electro-motive force to a predetermined value after each change in the cell current, means including said thermionic valve to produce a current indicative of a given charge on said cell-resistance connection, means for amplifying said current, and a quick indicating means for indicating when the current corresponds to the given charge on said cell-resistance connection.

10. Apparatus for comparing light intensities comprising a photo-electric cell having a cathode and anode, connected through a source of electrical potential to the grid and cathode of a thermionic valve, means connected between the plate and cathode of said thermionic valve for indicating a predetermined potential on said grid, and a measurable adjustable potential source connected in shunt with said thermionic valve, grid and cathode, said adjustable potential source being adapted to neutralize said first named source of electrical potential whereby various potential drops across said photo-electric cell resulting from various light intensities may be comparatively measured.

11. Apparatus for measuring light intensity comprising a photo-electric cell having an anode and cathode, said anode being grounded through a source of fixed electrical potential, said cathode being connected to a grid of a thermionic valve, a cathode in said valve connected to ground and a plate circuit including means adapted to indicate a predetermined grid potential, a resistor and variable source of electrical potential connected in shunt with said cell and fixed electrical potential and a shield for said photo-electric cell connected intermediate said resistor and said variable source of electrical potential.

12. Apparatus for measuring light intensity comprising a photo-electric cell having a cathode and an anode, said cathode being connected to a grid of an electron discharge tube, said anode of the photo-electric cell being connected through a source of fixed electrical energy to the cathode of said electron discharge tube, means connected to the plate and cathode of said electron discharge tube for indicating a predetermined grid potential thereon, and a resistance and adjustable measurable source of electrical energy connected in shunt with said photo-electric cell and said first named source of electrical energy, said sources of electrical energy having their potentials opposed to one another.

13. An apparatus for determining color characteristics of a body which comprises means for producing a standard illumination, a spectroscope adapted to receive a beam of light from said illumination, means for successively transmitting said beam of light through said body and directly into a photo-electric cell comprising an anode and cathode, a thermionic valve, the grid and cathode of said valve being connected to said photo-electric cell through a source of fixed potential energy, means including an adjustable source of potential energy connected in shunt with said grid and cathode, said potentials being opposed to one another, and means connected to the plate and cathode of said thermionic valve for indicating a predetermined grid charge thereon.

14. Apparatus for comparing light intensities comprising a photo-electric cell, a fixed resistance, a source of variable potential and a source of substantially constant potential arranged in series, a connection between the cell and fixed resistance, and between the two potential sources to the grid and cathode respectively of an amplifier tube, a pair of vacuum tubes arranged in a bridge circuit, a common battery, connected to the plates thereof through balanced resistors, a galvanometer connected between the plates for indicating balance, one of the grids of said vacuum tubes being connected to the plate of said amplifier tube and the other grid having means for impressing a potential thereon of any suitable value to balance the bridge circuit.

HAROLD D. ELLSWORTH.
MONROE G. BARNARD.